United States Patent
Lelic et al.

(10) Patent No.: US 8,814,130 B2
(45) Date of Patent: Aug. 26, 2014

(54) DISCHARGE FLOW CONTROL VALVE

(75) Inventors: Muhidin A. Lelic, Cary, NC (US);
Fanping Sun, Glastonbury, CT (US);
Zaffir A. Chaudhry, South Glastonbury, CT (US); Tony George, Cincinnati, OH (US); Lyle H. Hamilton, Cincinnati, OH (US); Robert G. Dunster, Slough (GB);
Rob J. Lade, Marlow (GB); Paul C. Upton, Lancaster (GB); Mark Williamson, Lancaster (GB)

(73) Assignee: UTC Fire & Security Corporation, Farmington, CT (US)

(*) Notice: Subject to any disclaimer, the term of this patent is extended or adjusted under 35 U.S.C. 154(b) by 462 days.

(21) Appl. No.: 13/140,160

(22) PCT Filed: Dec. 29, 2008

(86) PCT No.: PCT/US2008/088414
§ 371 (c)(1),
(2), (4) Date: Jun. 16, 2011

(87) PCT Pub. No.: WO2010/077231
PCT Pub. Date: Jul. 8, 2010

(65) Prior Publication Data
US 2011/0260081 A1    Oct. 27, 2011

(51) Int. Cl.
*F16K 31/12*    (2006.01)

(52) U.S. Cl.
USPC .............. 251/25; 251/63.4; 251/63.5

(58) Field of Classification Search
USPC ............... 251/25, 28, 30.01–30.05, 36, 63.4, 251/63.5, 144
See application file for complete search history.

(56) References Cited

U.S. PATENT DOCUMENTS

| 7,669,830 B2 * | 3/2010 | Franconi .................... 251/30.02 |
| 7,815,162 B2 * | 10/2010 | Entwistle et al. .......... 251/30.02 |
| 2004/0194977 A1 | 10/2004 | Stilwell et al. |
| 2006/0180207 A1 | 8/2006 | Itano et al. |

FOREIGN PATENT DOCUMENTS

WO    2007073390    6/2007

OTHER PUBLICATIONS

International Preliminary Report on Patentability mailed Feb. 10, 2011.
International Search Report and Written Opinion mailed Mar. 12, 2009.

* cited by examiner

*Primary Examiner* — John K Fristoe, Jr.
*Assistant Examiner* — Marina Tietjen
(74) *Attorney, Agent, or Firm* — Cantor Colburn LLP (57) ABSTRACT

A self-regulating valve controls the flow of high pressure gas discharging from a gas cylinder in a fire suppression system in response to a detection of a fire within a protected space by a two-step process which reduces the pressure rise within the protected space upon release of the fire suppression gas into the protected space.

11 Claims, 5 Drawing Sheets

DISCHARGE FLOW CONTROL VALVE

FIELD OF THE INVENTION

This invention relates generally to fluid flow control and, more particularly, to a self-regulating valve for controlling the flow of fluid from a source of pressurized fluid, such as, for example, but not limited to, pressurized fire suppression gas discharging into the gas distribution network of a fire/explosion suppression system.

BACKGROUND OF THE INVENTION

Hazard suppression, such as fire and explosion systems, are commonly installed in buildings for protecting valuable equipment and items, such as for example found in data centers, computer rooms, laboratories, art galleries, museums, libraries, archives and the like. Conventional hazard suppression systems now commonly employ chemically inert gases such as nitrogen, argon, carbon dioxide, and mixtures thereof as the suppression agent. These gases are naturally occurring gases and, unlike formerly commonly used man-made chemicals such as Halon, do not contribute to depletion of the atmosphere's ozone layer.

To support ignition and sustain combustion, adequate levels of combustible material, oxygen and heat must be present. Conventional inert gas based suppression systems are typically designed to release sufficient inert gas into an enclosure to dilute the level of oxygen in the atmosphere within the enclosure from the normal ambient concentration of 21% by volume down to a lower concentration, depending upon the application to about as low as 12.5% in accordance with applicable standards, in order to suppress or extinguish a fire. Further, inert gas systems must be designed to release a sufficient amount of inert gas into the protected space so as to effectively suppress the fire.

In inert gas based suppression systems, the inert gas is typically stored in one or more storage vessels, such as gas cylinders. To reduce the volume of gas storage required, and therefore the number of gas cylinders required, the inert gas must be stored at a relatively high pressure, typically at a pressure of about 300 bars or more. The delivery of a large amount of high pressure inert gas into the protected space, typically a room or other enclosure, within a short period of time may cause an overpressure in the protected space. Such an overpressure could potentially damage equipment, artifacts or other items, or even the structure of the room. Consequently, it is conventional practice to provide a special vent or vents in the structure of the room or enclosure that are capable of relieving any overpressure. Such vents add cost to the suppression system and in required size are proportional to the peak mass flow rate of the high pressure inert gas into the protected space.

Such an overpressure in the protected space is generally the result of the large amount of gas being discharged into the protected space. To control the release of the high pressure inert gas from the gas storage vessel, a gas release valve is mounted to the gas discharge outlet of gas storage vessel. In its closed position, the gas release valve is operative to prevent the high pressure gas from discharging from the gas storage vessel. When activated in response to the detection of a fire or explosion within the protected space, the valve opens to allow the high pressure gas to escape from the gas storage vessel into the protected space. Characteristic of conventional gas release valves, the mass flow rate upon discharge of the high pressure gas peaks rapidly, within a few seconds following discharge and then decays exponentially.

SUMMARY OF THE INVENTION

A self-regulating valve is provided for controlling fluid flow from a source of high pressure fluid, such as, for example, but not limited to, fire suppression gas.

The valve includes a valve body defining an axially extending cavity having an open lower end and a discharge port opening to the cavity, a control piston movable within the cavity of the valve body along an axis between a first and a second position, a two-piece plug, a valve actuator and a control piston actuator. The two-piece plug has a first plug body and a second plug body. The second plug body is axially movable relative to the first plug body, and the first plug body movable within the valve cavity along the axis between a valve closed position, a valve partially open position, and a valve fully open position. The valve actuator, when actuated, allows the first plug body to move from the valve closed position to the partially open position. The control piston actuator causes the control piston to move from the first position to the second position when a gas pressure in the gas cylinder is less than a predetermined pressure thereby allowing the first plug body to move from the valve partially open position to the valve fully open position. The second plug body is axially movable relative to the first plug body between a first position abutting the first plug body and a second position spaced axially away from the first plug body. The valve may include a return piston operatively associated with the first plug body and moveable within an axially extending cavity defined within the control piston along the axis, and a return spring operatively associated with the return piston.

The cavity of the valve body has a closed second end and may further define a first chamber at the second closed end of the cavity, a second chamber at the open end of the cavity, and a third chamber intermediate the first chamber and the second chamber into which the discharge port opens. A region of the first chamber abutting the closed second end of the cavity comprises a control chamber, the second chamber comprises a gas inlet chamber, and the third chamber comprises a bias chamber. The first chamber may be in connected directly in pressure equalization relationship with the second chamber. The two-piece plug is disposed within the third chamber. The valve actuator is operative when actuated to vent the third chamber to ambient pressure.

BRIEF DESCRIPTION OF THE DRAWINGS

For a further understanding of the invention, reference will be made to the following detailed description which is to be read in connection with the accompanying drawing, where:

FIG. 9 is a series of elevation views showing the positioning of the lower plug body relative to the valve seat and inlet chamber, of which

DETAILED DESCRIPTION

Figure 1:
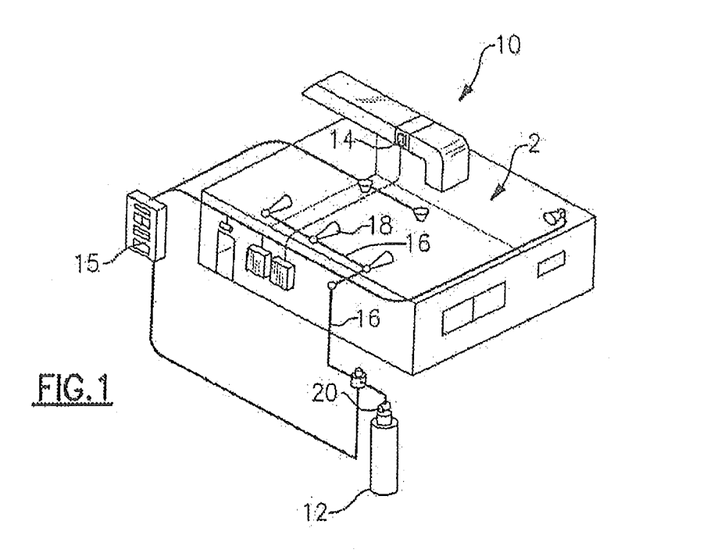
FIG. 1 is a schematic representation of an inert gas based fire suppression system.

Referring initially to FIG. 1, there is depicted a schematic representation of an inert gas based fire suppression system 10. At least one gas cylinder 12, or other gas storage vessel, containing a chemically inert gas, such as for example argon, nitrogen, carbon dioxide or mixtures thereof, is located in a storage area or room near the space 2, such as an enclosed room or other enclosure, to be protected. It is to be understood that a single gas cylinder is shown in FIG. 1 solely for purposes of simplicity and that the fire suppression system 10 may incorporate a plurality of gas cylinders 12, the particular number in any application depending primarily upon the volume of the space 2 to be protected.

The gas cylinder 12 is equipped with a self-regulating gas flow control valve 20 for controlling the gas mass flow rate during discharge of inert gas from the gas cylinder 12. In response to detection of a fire or explosion in the protected space 2 by a fire or explosion detector 14, a controller 15 actuates the valve 20 to initiate the release of the inert gas which is discharged through the valve 20 into through a network of distribution pipes 16 to one or more discharge nozzles 18 to be dispersed into the protected space 2 so as to dilute the oxygen concentration therein from ambient levels down to a substantially lower concentration to effectively suppress or extinguish the fire.

Figures 2, 3:
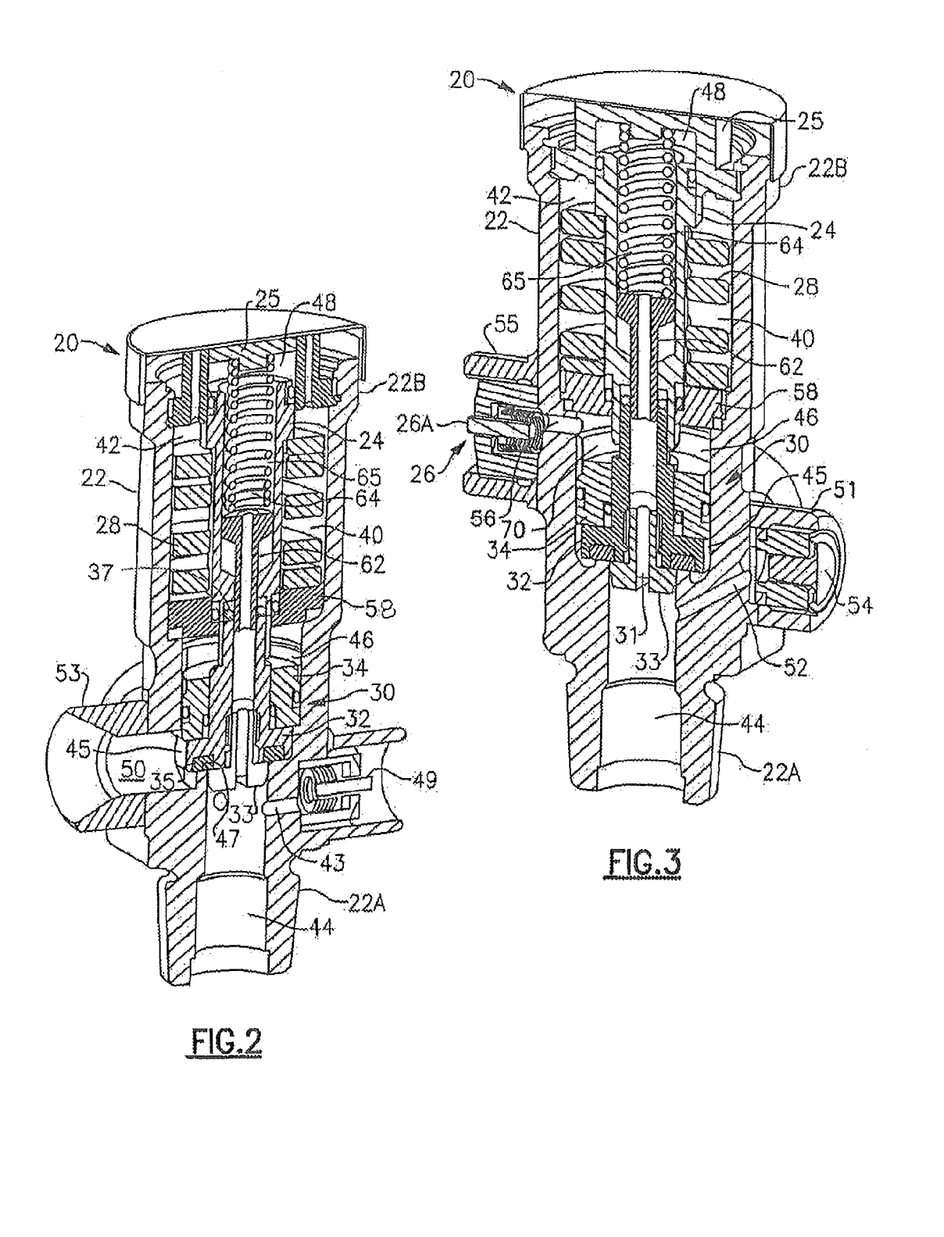
FIG. 2 is a perspective side elevation view, partly in section, of an exemplary embodiment of a self-regulating gas flow control valve for in accordance with the present invention.
FIG. 3 is a perspective side elevation view, partly in section, of the exemplary embodiment of a self-regulating gas flow control valve shown in FIG. 2 rotated 90 degrees.

Referring now to FIGS. 2 and 3, the self-regulating flow control valve 20 generally includes a valve body 22, a control piston 24, a valve actuator 26, a piston actuator 28, and a two-piece plug 30. The self-regulating valve 20 operates in a two-step process to throttle the flow of inert gas from the cylinder 12 so as to control the mass flow into the protected space 2.

The valve body 22 defines an axially extending central cavity 40 having an open proximal end and a closed distal end. As used herein in describing the valve 20, the term "proximal" refers to the region at the end 22A of the valve body 22 that is provided with threads for mounting to the neck of the gas cylinder 12 and the term "distal" refers to the region at the end 22B of the valve body 22 that constitutes the end thereof axially remote from the proximal end of the valve body 22. The valve cavity 40 defines a first chamber 42 in the distal end 22A of the valve body 22, a second chamber 44 that functions as, and may also be referred to herein as, an inlet chamber in the proximal end 22B of the valve body 22, and a third chamber 46 that functions as, and may also be referred to herein as, a bias chamber in the region of the valve body 22 intermediate the first and second chambers. The first chamber 42, which is not pressurized, houses the control piston 24 and the control spring, i.e. the piston actuator, 28. A distal region, that is a subchamber 48, of the first chamber 42 functions as a control chamber, and may also be referred to herein as the control chamber.

The second chamber 44 is open in fluid communication with the interior of the gas cylinder 12 when the valve 20 is mounted to the neck of the gas cylinder 12. Additionally, a filling port 43 opens into the second chamber 44. Thus, the second chamber 44 forms both a fill chamber through which inert gas passes from the filling port 43 into the interior of the gas cylinder 12 when the gas cylinder 12 is being charged with inert gas and also forms an inlet chamber through which inert gas passes during release from the gas cylinder 12. A pressure relief port 52 extending through the valve body 22 and a nipple 51 opens into the second chamber 44. A burst disc 54 is provided at the outlet of the relief port 52 that is designed to burst open in the event the gas pressure within the interior of the gas cylinder 12 exceeds a maximum set pressure.

A discharge port 50 opens into the third chamber 46 in a proximal region thereof. The discharge port 50 may be defined within a nipple 53 that is adapted to connect into the gas distribution network. Additionally, an actuation port 56, defined with a nipple 55, opens into the third chamber 46 in a distal region thereof. The valve actuator 26, which in the depicted embodiment comprises a Schrader valve having a spring biased stem 26A, is disposed within the nipple 55 so as to close the actuation port 56 until such time as the valve 20 is to be actuated in response to detection of a fire. In such event, when the stem 26A is depressed at the command of the controller 15, the inert gas within the third chamber very rapidly vents to ambient thereby rapidly reducing the gas pressure within the third chamber 46.

Figures 8, 10:
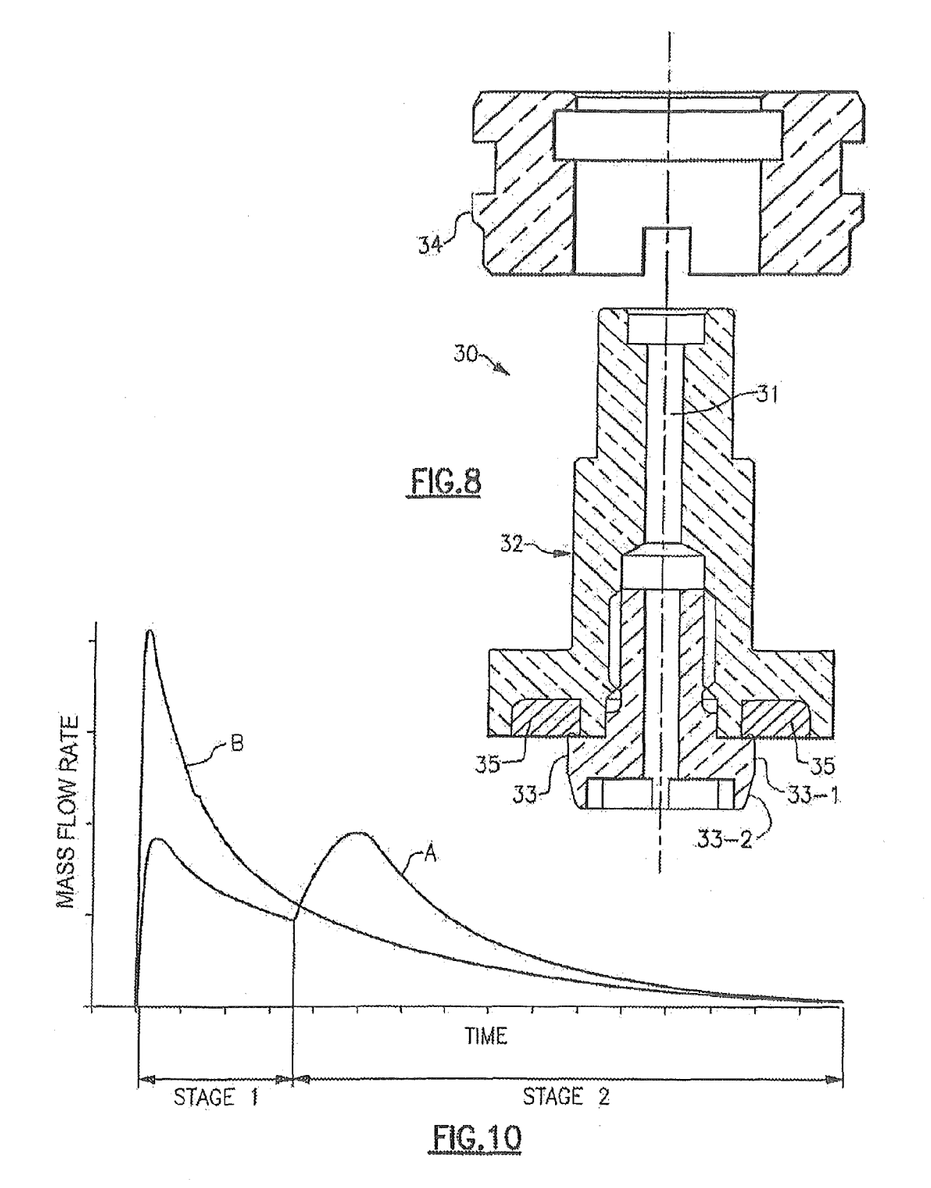
FIG. 8 is an exploded sectioned side elevation view of the two-piece plug of the self-regulating valve shown in FIGS. 2 and 3.
FIG. 10 is a graph illustrating the change in mass flow rate over time following activation characteristic of the self-regulating valve of the invention (curve A) and characteristic of a prior art valve without flow control (curve B).

Referring now also to FIG. 8, the two-piece plug 30, which is housed within the third chamber 46, includes a first plug body 32 and a second plug body 34. The first plug body 32 has a cylindrical disc and a smaller diameter central shaft portion that extends axially and distally from the distal face of the disc. The first plug body 32 also has a nose 33 protruding axially from the proximal face of the disc of the first valve body 32 into the second chamber 44. As best seen in FIG. 8, the nose 33 has a generally cylindrical tip with the end of the tip being tapered. While the nose is being withdrawn from the second chamber upon actuation of the valve 20, the parallel portion of the tip controls the discharge flow rate during the first stage of gas discharge and the tapered portion controls the gas discharge rate during the initial part of the second stage of gas discharge. A passage 31 extends axially through the shaft portion, the disc and the nose 33 of the first plug body 32. A valve seal 35 is carried on the proximal face of the disc that, when the valve 20 is in the valve closed position, seats against a shoulder 47 formed at the interface of the second chamber 44 and the third chamber 46 and circumscribing the opening of the second chamber 44 into the third chamber 46. When the valve 20 is in the valve closed position, with the valve seal 35 seating against the shoulder 47, a seal is formed that prevents the pressurized inert gas from passing from the second chamber 44 into the discharge port 50.

The second plug body 34 comprises an annular member disposed about the shaft of the first plug body 32 on the distal side of the first plug body 32. The second plug body 34 has an outer diameter that is slightly smaller than the internal diameter of the third chamber 46 whereby the second plug body 34 may move axially within the third chamber 46. An inner O-ring seal and an outer O-ring seal are carried on the second plug body 34 to provide gas-tight seals, respectfully, between the second plug body 34 and the shaft of the first plug body 32 and the second plug body 34 and the inner wall of the third chamber 46. The disc of the first plug body 32 has a diameter that is smaller than the inner diameter of the third chamber 46 whereby an annular gap 45 is formed therebetween.

The first chamber 42 is formed at distal end of the valve body 22. An annular member 58 having an axially extending central opening therethrough is disposed across the valve cavity 40 at the interface of the first chamber 42 and the third chamber 46. The annular member 58 may be a washer-like disk that is inserted into the first chamber 42 prior to installing the valve end cap to the distal end of the valve body 22 and threaded about its outer circumference into the inner wall of the valve body at the opposite end of the first chamber 42 to abut against a shoulder formed within the valve body 22 at the interface between the first chamber 42 and the third chamber 46. A circumferential seal is provided about the outer circumference of the annular member 58 in contact with the surrounding surface of the inner wall of the valve cavity 40 so as to form a gas tight seal between the third chamber 46 and the first chamber 42. In the embodiment depicted in FIGS. 2 and 3, the first chamber 42 includes a subchamber 48 that functions as, and may also be referred to herein as, the control chamber. The subchamber 48 is defined within an end cap plug 25 that is threaded into the distal end of the central cavity of the valve body 22 to cap the distal end of the valve body 22, thereby closing the distal end of the valve cavity 40.

The control piston 24 is disposed generally within the first chamber 42 and extends therethrough along the central axis of the valve cavity 40 with the distal end of the control piston 24 being disposed within the subchamber 48 and with the proximal end of the control piston 24 extending into and through the central opening through the annular member 58. A seal, such as an O-ring seal, is carried in a seal gland formed in the outer circumference of the distal end portion of the control piston 24 and contacts the inner wall of the end cap plug 25 to provide a gas tight seal that isolates the subchamber 48, which constitutes a control chamber, from the rest of the first chamber 42. A seal, such as an O-ring seal, is also carried in a seal gland formed in the outer circumference of the proximal end portion of the control piston 24 and contacts the surrounding wall of the central opening through the annular member 58 to provide a gas-tight seal that precludes gas flow from the third chamber 44 through the central opening about the control piston 24 into the first chamber 42. A control spring, which constitutes the control piston actuator 28, is disposed within the first chamber about the control piston 24. In the embodiment depicted in FIGS. 2 and 3, the control spring 28 comprises a coil spring disposed about the control piston 24 that seats at it proximal end against the annular member 58 and at its distal end on a shoulder provided on the outer wall of the control piston 24 near the distal end thereof.

The control piston 24 defines a cavity 65 that extends axially therethrough and includes a return piston 62 and a return spring 64 disposed in operative association within the cavity 65. The distal end of the shaft 32B of the first plug body 32 is received within the proximal end of the cavity 65 and is axially translatable within the central cavity 63. The return piston 62 mates at its proximal end with the distal end of the shaft 32B of the first plug body 32 and has a central passage 63 extending axially therethrough. Collectively, the cavity 65, the passage 63 and the passage 33 establish a pressure equalization passage that connects the subchamber 48 and the second chamber 44. The return spring 64 is disposed within the cavity 65 and extends between the distal end face of the return piston 62 and the valve end cap mounted to the distal end of the valve body 22.

The control piston 24 is axially translatable within the valve cavity 40 with the distal end of the control piston 24 being moveable within the subchamber 48 and the proximal end of the control piston 24 being moveable along the central opening through the annular member 58 separating the third and first chambers. In the valve closed position, the gas pressure within the subchamber 48, which is equal to the gas pressure within the second chamber 44, acts upon the distal end of the control piston 24 against the bias force of the control spring 60 and against the pressure force exerted upon the face of the nose of the first plug body by the gas pressure within the second chamber 44, which is equal to the gas pressure within gas cylinder 12.

In application, the self-regulating gas flow control valve 20 is installed on the gas cylinder 12 by threading the proximal end of the valve body into the throat of the gas cylinder 12. After the valve 20 is securely installed, the gas cylinder 12 may be charged with the desired gas by connecting the nipple defining the fill port to a supply line connected to a source of the pressurized gas. During the charging process, the charge gas passes through the charge port 45 into and through the second chamber 44 to fill the gas cylinder 12 to a desired internal pressure level, such as for example about 300 bars. The charge gas also passes from the second chamber 44 through the pressure equalization passage into the first chamber 42. Additionally, the high pressure charge gas acts on the nose of the first plug body to force the first plug body away from the valve seat surface, thereby opening an annular gap through which the high pressure charge gas may pass into the third chamber 46. Upon completion of the charge process, the supply line is removed and the filling port 45 is closed as the Schrader valve 49 closes. At this point, the valve 20 is in the valve closed position and the gas pressure within each of the control chamber 48, the inlet chamber 44 and the bias chamber 46 are in equilibrium at a gas pressure equal to the gas pressure within the gas cylinder 12.

The operation of the self-regulating gas flow control valve 20 will be discussed with reference to FIGS. 4-7 in particular, which illustrate, respectively, the valve 20 in the valve closed position, the valve partially open position, the valve fully open position, and the valve return position following discharge of all of the inert gas from the gas cylinder 12.

Figure 4:
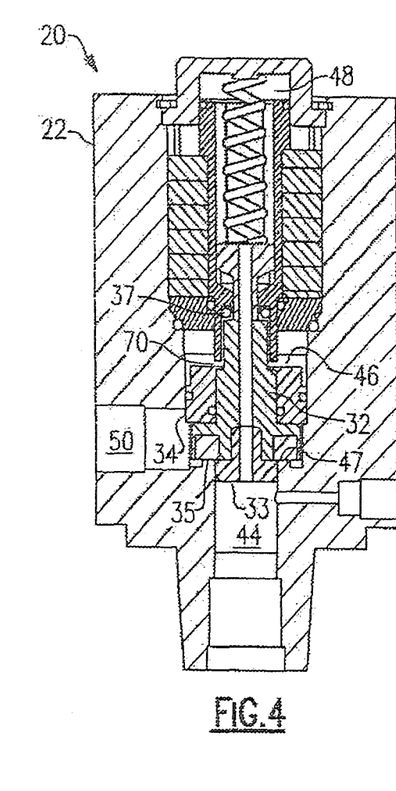
FIG. 4 is a sectioned side elevation view of the valve of FIG. 2 in a fully closed position.

Referring now to FIG. 4, in particular, in the valve closed position, the valve actuator is powered off whereby the actuator port remains closed. With the actuator port closed, the pressure within the third chamber 46 remains in balance with the pressure in the second chamber 44. Since the area on the back side of the second plug body 34 upon which the gas pressure within the third chamber 46 acts is greater than the area on the face of the nose 33 of the first plug body 32 upon which the gas pressure within the second chamber 44 acts, the first plug body 32 is biased toward the second chamber 44 with the valve seal ring 35 contacting the valve seat surface 47 to maintain a gas tight seal thereby precluding passage of inert gas from the gas cylinder 12 through the second chamber 44 to the discharge port 50. In the valve closed position, a gap 70 is maintained between a shoulder on the back side of the first valve body 32 and the proximal tip of the control piston 24. The gap 70 is relatively small, for example about 2.5 millimeters in width, and functions to limit the axial initial movement of the first plug body in the distal direction when the valve 20 is initially actuated.

Figure 5:
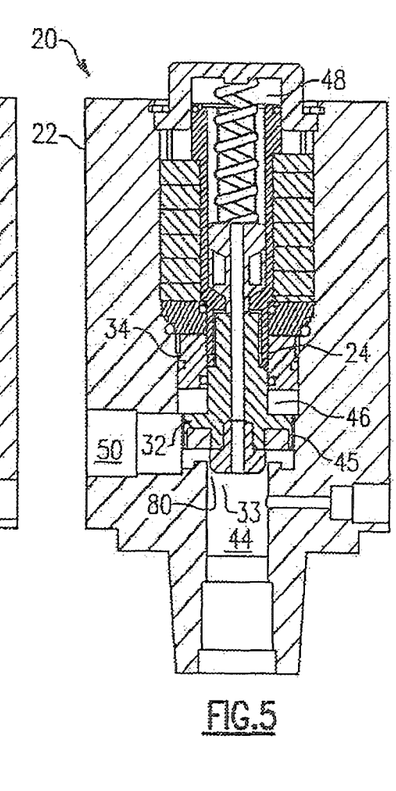
FIG. 5 is a sectioned side elevation view of the valve of FIG. 2 in a partially open position.

Referring now in FIG. 5, in particular, wherein the valve 20 is shown in the partially open position, upon detection of a fire in the protected space 2, the controller 15 powers the valve actuator to open the actuation port, in the depicted embodiment by depressing the stem of the Schrader, thereby allowing the high pressure gas from the third chamber 46 to very rapidly vent through the actuation port to ambient pressure. Due to the rapid venting, the pressure within the third chamber 46 precipitously drops. As a consequence, a pressure differential results between the high gas pressure within the second chamber 44, which is open to the gas cylinder 12, and the rapidly dropping gas pressure within the third chamber 46 which results in the first valve body being rapidly driven away from the valve seat, thereby opening an annular space 80 around the nose 33 of the first plug body 32 through which high pressure gas may now pass from the gas cylinder 12 via the second chamber 44 into and through the discharge port. However, the width of the annular space 80 is limited to the width of the gap 70 because the movement of the first plug body 32 is physically stopped by the shoulder on the back side of the first plug body 32 contacting the proximal tip of the control piston 24.

In addition to discharging through the discharge port 50, some of the high pressure gas from the second chamber 44 will pass through the annular gap 45 between the first plug body 32 and the surrounding inner wall of the valve body 22 to act upon and drive the second plug body 34 axially away from the back side of the first plug body thereby creating a volume therebetween which is filled with the high pressure gas. Almost instantly, the back side of the second plug body 34 contacts and comes to rest against the forward surface of the annular member 58. Therefore, the gas pressure within the volume created upon movement of the second plug body 34 away from the first plug body 32 rises as this void is filled with high pressure gas from the gas cylinder 12 passing into the third chamber 46 through the gap 45 again balancing the gas pressure within the third chamber 46 with the pressure within the second chamber 44. The third chamber 46 now functions as a bias chamber with the gas pressure therein acting against the backside of the first plug body 32. The gas pressure on both sides of the first plug body is now in balance. Thus, pressure variations in the distribution pipe network into which the gas discharging from the valve 20 through the discharge port 50 will not effect the operation of the self-regulating valve 20 in controlling the discharge flow rate. If the plug 30 were a single-piece body, such as in the self-regulating flow control valve disclosed in International patent application publication no. WO/2007/073390, downstream fluctuations in pressure in the pipe distribution network could impact upon flow control.

Figure 6:
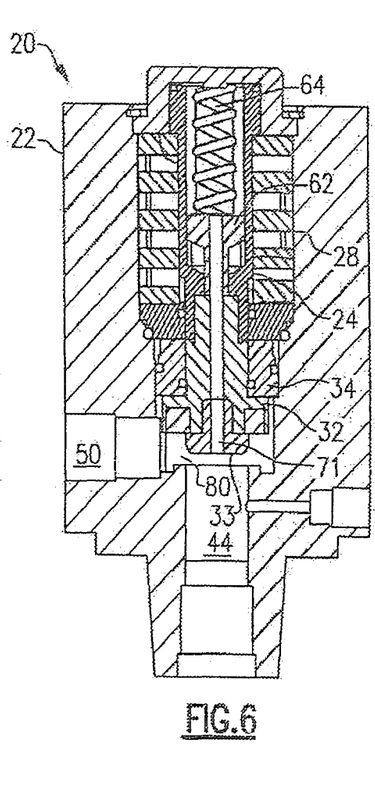
FIG. 6 is a sectioned side elevation view of the valve of FIG. 2 in a fully open position.

Once the first plug body 32 has moved away from the seal seat 47 by an amount equal to the width of the gap 70, for example about 2.5 millimeters, and initial movement has been arrested by the proximal tip of the control piston 24, further movement of the first plug body distally is controlled by the net forces acting on the control piston. An O-ring 37, disposed in the gap 70 between the proximal tip of the control piston 24 and the distal end of the stem of the first plug body 32, is compressed by this initial movement of the first plug body 32 which seals the bias chamber 46 and stops the flow of gas out of the bias chamber 46 through the actuation port. Referring now to FIG. 6, in particular, wherein the valve 20 is shown in the fully open position, because the subchamber 48, that is the control chamber, and the second chamber 44, is open to the gas cylinder 12 and forms an inlet chamber for gas discharging from the gas cylinder 12 and, are in fluid communication through the pressure equalization passage 71, the pressure within the subchamber 48 decreases at the same rate as the pressure within the gas cylinder 12 decreases as the inert gas discharges from the gas cylinder 12. Consequently, the pressure force acting on the distal face of the control piston 24 decreases steadily. The control spring 28 surrounding the control piston 24 biases the control piston distally against this decreasing pressure force acting upon the distal face of the control piston. At predetermined pressure level, the combined force of the spring bias force exerted upon the control piston by the control spring 28 and the pressure force acting on the proximal face of the first plug body 32 overcomes the pressure force acting on the distal face of the control piston 24. The pressure level at which this event occurs will depend upon the stiffness of the control spring 28 selected by the designer. As a result, the control piston 24 and the first plug body 32 move axially in a distal direction, thereby further opening the flow passage from the second chamber to the discharge port. As the first plug body moves distally under the force of the pressure of the gas discharging from the gas cylinder 12, the return spring is compressed as the stem of the first plug body pushes the return piston distally against that return spring. The movement of the first plug body 32 is arrested when the control spring 28 becomes fully extended, at which point the valve 20 is in the full open position as illustrated in FIG. 6.

Figure 7:
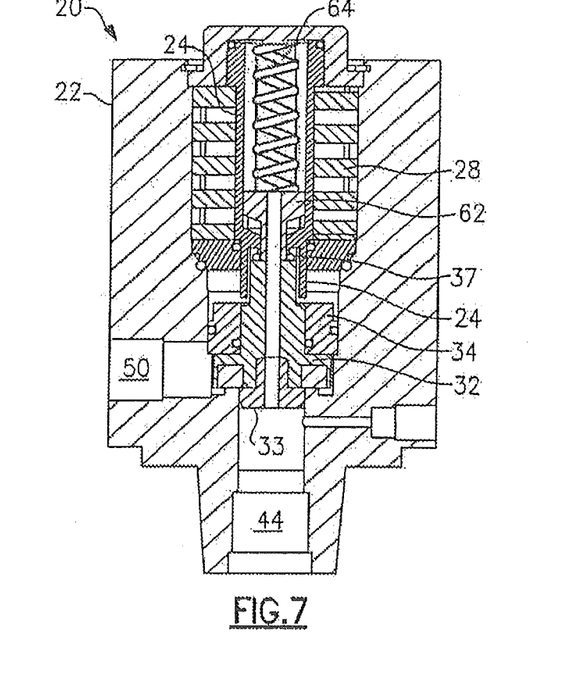
FIG. 7 is a sectioned side elevation view of the valve of FIG. 2 in a post-discharge position.

FIG. 7 illustrates the relative position of the various valve components of the valve 20 in the post discharge position, that is, the position of the valve following discharge of the most of the inert gas from the gas cylinder 12. When most of the inert gas has discharged from the gas cylinder 12, the pressure exerted upon the face of the first plug body 32 will be low and the spring bias force acting upon the distal face of the return piston 62 will exceed the pressure force acting upon the face of the first plug body 32, thereby causing the return piston 62 to move axially in the proximal direction and driving the first plug body 32 back into the closed position, as illustrated in FIG. 7. The control piston 24, however, remains in the post-discharge position since the force exerted by the low pressure acting on the distal face of the control piston is insufficient to overcome the spring bias force exerted on the control piston by the control spring. With the valve actuator unpowered, following the discharge of the inert gas form the gas cylinder 12 into the protected space 2 has been completed, the actuation port is closed so that gas can not vent from the third chamber and the gas cylinder is ready to be charged with inert gas as hereinbefore described. Generally, the second plug body 34 will simply follow the first plug body 32 back to the valve closed position, as shown in FIG. 7, however, depending upon design tolerances the second plug body 34 may remain in its valve fully open position until recharging of the gas cylinder 12 with high pressure gas at which time the second plug body 32 will return to the valve closed position.

Figure 9A:
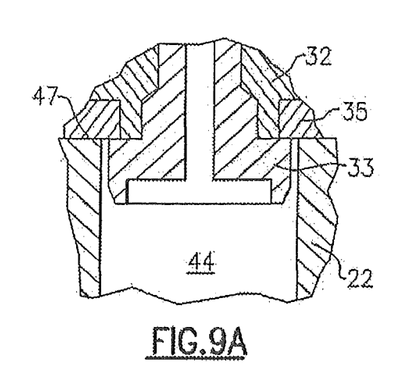
FIG. 9A illustrates the positioning in the valve closed position.
Figure 9B:
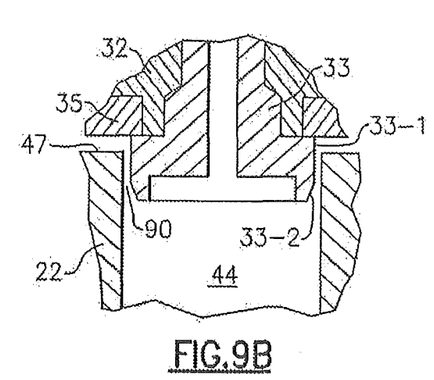
FIG. 9B illustrates the positioning in the first stage of gas discharge.
Figure 9C:
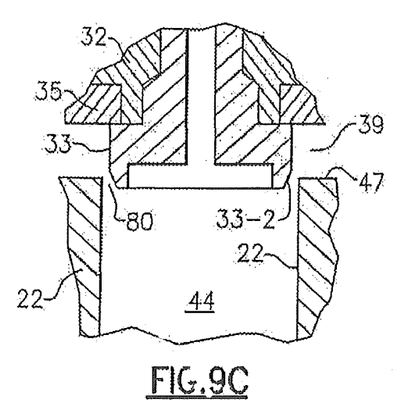
FIG. 9C illustrates the positioning in the initial portion of the second stage of gas discharge.
Figure 9D:
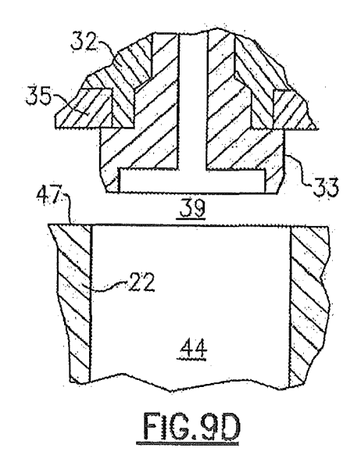
FIG. 9D illustrates the positioning in the remainder of the second stage.

The control of the discharge flow rate in the first stage and second stage of fluid discharge self-regulating valve 20 will be described in relation to positioning of the first plug body with reference to FIG. 9 wherein: FIG. 9A illustrates the positioning of the first plug body 32 in the valve closed position; FIG. 9B illustrates the positioning of the nose 33 of the first plug body 32 relative to the interior structure of the valve body 22 during the first stage of discharge; FIG. 9C illustrates the positioning of the nose 33 during the initial portion of the second stage of discharge; and FIG. 9D illustrates the position of the nose 33 at the end of movement of the first plug body 32. As illustrated in FIG. 9A, in the valve closed position, the nose 33 of the first plug body 32 extends into the second chamber 44 and the front face of the first plug body 32 contacts the valve seat 47 in sealing relationship thereby preventing discharge of the high pressure gas from the gas cylinder 12.

Referring now to FIG. 9B, the movement of the first plug body 32 away from the valve seat 47 upon activation of valve 20 opens a volume 39 within the bias chamber between the front face of the first plug body 32 and the facing interior wall of the valve body 22. The volume 39 is open to the second chamber 44 to receive gas discharging from the gas cylinder 12 and is also open to the discharge port 50. In the first stage of discharge, the rate of flow of gas from the second chamber 44 into the volume 39 is throttled by the gap 90 existing between the outer circumferential wall of the cylinder portion 33-1 of the nose 33 of the first plug body 32 and the surrounding wall of the second chamber 44. The width of the gap 90 is equal to the difference between the inner diameter, $D_{SC}$, of the second chamber 44 and the outer diameter, $D_N$, of the cylinder portion 33-1 of the nose 33. The width of the gap 90 is selected during design of the valve 20 and predetermines the characteristics of the flow rate control profile during the first stage of gas discharge.

Referring now to FIGS. 9C and 9D, in the second stage of discharge, the rate of flow of gas from the second chamber 44 into the volume 39 is throttled, in the initial portion of the second stage of discharge, by the gap 80 existing between the taper tip 33-2 of the nose 33 and the surrounding wall of the second chamber 44, as shown in FIG. 9C. The discharge flow rate increases as the end of the tip 33-2 of the nose 33 is withdrawn from the second chamber 44 and then, when the tip 33-2 of the nose 33 is fully withdrawn and thus the valve is fully open, as illustrated in 9D, decays exponentially in proportion to the rate of decrease of pressure within the gas cylinder 12. The length and taper of the tip 33-2 of the nose 33 are selected during design of the valve 20 and predetermine the characteristics of the flow rate control profile during the second stage of gas discharge.

The action of the self-regulating valve 20 during the discharge of inert gas from the gas cylinder 12 results in a two-step release of gas as exemplified by curve A presented in FIG. 10. In stage 1, the discharge gas mass flow rate rapidly reaches an initial peak mass flow as the first plug body 32 is forced away from the valve seat in response to a rapidly venting of the third chamber 46 thereby opening an initial relatively small discharge flow passage between the gas cylinder 12 and the discharge port. Then, at a design pressure level, a second stage gas release begins as the bias force of the control spring 28 overcomes the net pressure forces acting on the control piston 24 and pushes the control piston 28 deeper into the subchamber 48, thereby allowing the first plug body to move further in a distal direction and enlarging the discharge flow passage. When the discharge flow passage reaches the full open position, the second stage peak mass flow is reached and the mass flow rate thereafter decays, for example as illustrated in FIG. 10, as the gas pressure within the gas cylinder 12 decreases. By way of example, but not limitation, in a typical application, the overall time period for discharge of inert gas from the gas cylinder into the protected space 2 may last about 3 minutes, with operation of the self-regulating valve 20 in the first stage extending for only the first 15 to 20 seconds of that time period.

Curve B shown in FIG. 10 represents the discharge gas mass flow rate release profile characteristic of a conventional prior art container valve of the type commonly used in connection with inert gas cylinders in prior art fire suppression systems. As seen therein, with respect to the curve B profile, the mass flow rate is not controlled by the valve, but rapidly increases after actuation of the valve to a relatively high mass flow rate and then decays exponentially over the period of gas discharge as the pressure within the gas cylinder decreases. With such prior art valves, it is this very initial mass flow rate that may cause an undesirable overpressure in the room or enclosure into which the inert gas is released. As seen in FIG. 10, the self-regulating flow control valve of the invention produces a two-step gas release, as exemplified by curve A, wherein the peak discharge gas mass flow rate is substantially less than that associated with the characteristic prior art release profile exemplified by curve B. With the characteristic lower peak mass flow rates associated with the two-step release produced by the self-regulating valve of the invention, the likelihood of an overpressure in the protected space is greatly reduced and, in the event an overpressure does occur, that overpressure will be substantially reduced.

The self-regulating flow control valve of the invention has been described herein with reference to application in an inert gas fire suppression system. It is to be understood, however, that the self-regulating flow control valve of the invention may be applied for controlling flow to fluids other than inert gas and in applications other than inert gas fire suppression systems. For example, for purposes of illustration, the self regulating flow control valve of the invention could be applied to control output flow rate of water in fire fighting systems associated with oil rigs and the petrochemical industry, or used as a hydraulic regulating valve for pneumatically operated machinery.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

We claim:

1. A self-regulating valve for controlling fluid flow from a source of high pressure fluid, the valve comprising:
    a valve body defining an axially extending cavity having an open lower end and a discharge port opening to the cavity;
    a control piston movable within the cavity of the valve body along an axis between a first and a second position;
    a two-piece plug having a first plug body and a second plug body, the second plug body being axially movable relative to the first plug body, the first plug body movable within the cavity of the valve body along the axis between a valve closed position, a valve partially open position, and a valve fully open position, the second plug body axially movable relative to the control piston and separate from the control piston;
    a valve actuator that allows the first plug body to move from the valve closed position to the partially open position; and
    a control piston actuator that causes the control piston to move from the first position to the second position when a fluid pressure in the fluid source is less than a predetermined pressure thereby allowing the first plug body to move from the valve partially open position to the valve fully open position.

2. The self-regulating valve as recited in claim 1 wherein the second plug body is axially movable relative to the first plug body between a first position abutting the first plug body and a second position spaced axially away from the first plug body.

3. The self-regulating valve as recited in claim 1 wherein the cavity of the valve body has a closed second end and further defines a first chamber at the second closed end of the cavity, a second chamber at the lower open end of the cavity, and a third chamber intermediate the first chamber and the second chamber into which the discharge port opens.

4. The self-regulating valve as recited in claim 3 wherein a subchamber of the first chamber at the closed second end of the cavity comprises a control chamber, the second chamber comprises an inlet chamber, and the third chamber comprises a bias chamber.

5. The self-regulating valve as recited in claim 3 wherein the two-piece plug is disposed within the third chamber.

6. The self-regulating valve as recited in claim 3 wherein the valve actuator is operative when actuated to vent the third chamber to ambient pressure.

7. The self-regulating valve as recited in claim 3 wherein the control chamber, the bias chamber and the inlet chamber are connected directly in pressure communication.

8. A self-regulating valve for controlling fluid flow from a source of high pressure fluid, the valve comprising:
   a valve bode defining an axially extending cavity having an open lower end and a discharge port opening to the cavity;
   a control piston movable within the cavity of the valve body along an axis between a first and a second position;
   a two piece plug having a first plug body and a second plug body, the second plug body being axially movable relative to the first plug body the first plug body movable within the cavity of the valve body along the axis between a valve closed position, a valve partially open position, and a valve open position;
   a valve actuator that allows the first plug body to move from the valve closed position to the partially open position;
   a control piston actuator that causes the control piston to move from the first position to the second position when a fluid pressure in the fluid source is less than a predetermined pressure thereby allowing the first plug body to move from the valve partially open position to the valve fully open position;
   a return piston operatively associated with the first plug body and moveable within an axially extending cavity defined within the control piston along the axis; and
   a return spring operatively associated with the return piston.

9. A self-regulating valve for controlling the flow of gas discharging from a vessel containing high pressure gas, the valve comprising:
   a valve body defining an axially extending cavity having an open lower end adapted to be mounted to a gas discharge outlet of the gas vessel and a discharge port opening to the cavity;
   a control piston movable within the cavity of the valve body along an axis between a first and a second position;
   a two-piece plug having a first plug body and a second plug body, the second plug body being axially movable relative to the first plug body, the first plug body movable within the cavity of the valve body along the axis between a valve closed position, a valve partially open position, and a valve fully open position; a valve actuator that allows the first plug body to move from the valve closed position to the partially open position, the second plug body axially movable relative to the control piston and separate from the control piston; and
   a control piston actuator that causes the control piston to move from the first position to the second position when a gas pressure in the gas vessel is less than a predetermined pressure thereby allowing the first plug body to move from the valve partially open position to the valve fully open position.

10. The self-regulating valve as recited in claim 9 wherein the second plug body is axially movable relative to the first plug body between a first position abutting the first plug body and a second position spaced axially away from the first plug body.

11. A self-regulating valve for controlling the flow of gas discharging from a vessel containing high pressure gas, the valve comprising:
   a valve body defining an axially extending cavity having an open lower end adapted to be mounted to a gas discharge outlet of the gas vessel and a discharge port opening to the cavity;
   a control piston movable within the cavity of the valve body along an axis between a first and a second position;
   a two-piece plug having a first plug body and a second plug body, the second plug body being axially movable relative to the first plug body, the first plug body movable within the cavity of the valve body along the axis between a valve closed position, a valve partially open position, and a valve fully open position;
   a valve actuator that allows the first plug body to move from the valve closed position to the partially open position;
   a control piston actuator that causes the control piston to move from the first position to the second position when a gas pressure in the gas vessel is less than a predetermined pressure thereby allowing the first plug body to move from the valve partially open position to the valve fully open position;
   a return piston operatively associated with the first plug body and moveable within an axially extending cavity defined within the control piston along the axis; and
   a return spring operatively associated with the return piston.

* * * * *